United States Patent [19]

MacMillan

[11] 4,172,868
[45] Oct. 30, 1979

[54] METHOD OF RETREADING A TIRE INCLUDING TIRE DIAMETER FORESHORTENING BY VACUUM GRIP

[75] Inventor: Kenneth T. MacMillan, Macon, Ga.

[73] Assignee: Donald MacMillan & Son, Inc., Macon, Ga.

[21] Appl. No.: 919,475

[22] Filed: Jun. 27, 1978

Related U.S. Application Data

[62] Division of Ser. No. 628,902, Nov. 5, 1975, Pat. No. 4,035,118, which is a division of Ser. No. 391,816, Aug. 27, 1973, Pat. No. 3,997,284.

[51] Int. Cl.² ............................................. B29H 5/04
[52] U.S. Cl. ........................................ 264/36; 425/21; 425/58; 425/23; 264/315
[58] Field of Search ................. 425/19, 20, 21, 22, 425/23, 24, 25; 264/36, 315

[56] References Cited

U.S. PATENT DOCUMENTS

| 2,407,806 | 9/1946 | Arnold et al. | 425/21 |
| 2,475,579 | 7/1949 | Napier | 425/21 |
| 2,712,156 | 7/1955 | Potter et al. | 425/21 |
| 2,723,425 | 11/1955 | Mattox et al. | 425/21 |
| 2,835,921 | 5/1958 | White | 425/22 |
| 2,915,783 | 12/1959 | Fassero et al. | 425/21 |
| 3,184,794 | 5/1965 | Sherkin | 425/19 |
| 3,701,615 | 10/1972 | Johnson | 425/23 |
| 3,729,358 | 4/1973 | Barefoot | 425/21 X |
| 3,770,858 | 11/1973 | Ireland et al. | 425/21 X |
| 3,793,420 | 2/1974 | Fredricks et al. | 425/24 X |

*Primary Examiner*—J. Howard Flint, Jr.
*Attorney, Agent, or Firm*—Vincent L. Ramik

[57] ABSTRACT

This disclosure relates to a method of retreading a tire by inserting a tire and an annular bladder between a pair of open matrices with marginal portions of the bladder projecting beyond beads of the tire and resting upon peripheral edge portions of axially opposed bead aligner wheels; the annular bladder being disposed within the tire; inflating the bladder to form an annular vacuum gap between an annular terminal edge of each bladder marginal portion, an annular outboard portion of each bladder and opposing annular portions of the bead aligner wheel peripheral edge portions; radially foreshortening the tire by moving the bead aligner wheels away from each other while the tire is held thereon by the bladder, and thereafter closing the matrices, and further inflating the bladder to urge the tire into intimate conformity with the matrices.

13 Claims, 12 Drawing Figures

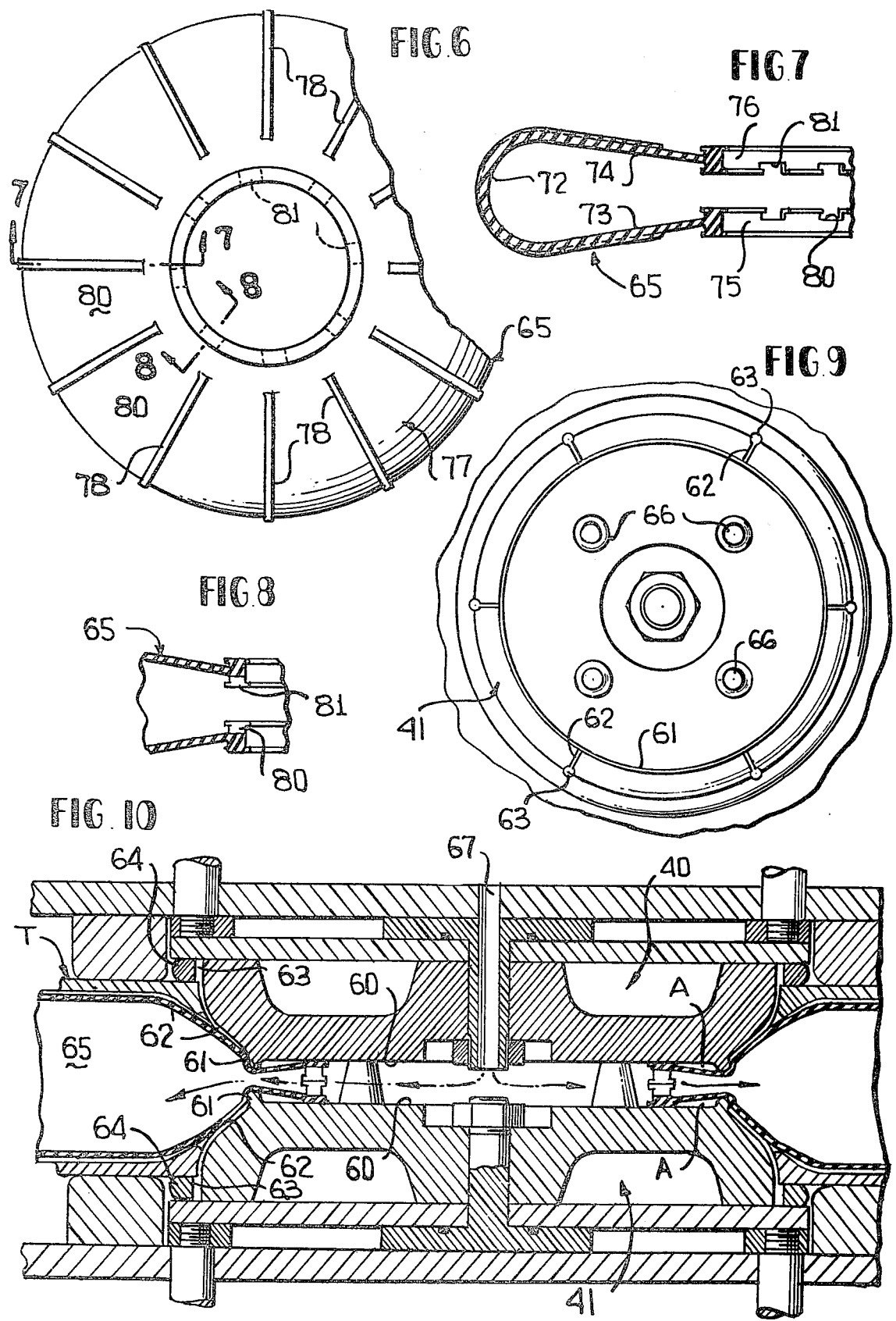

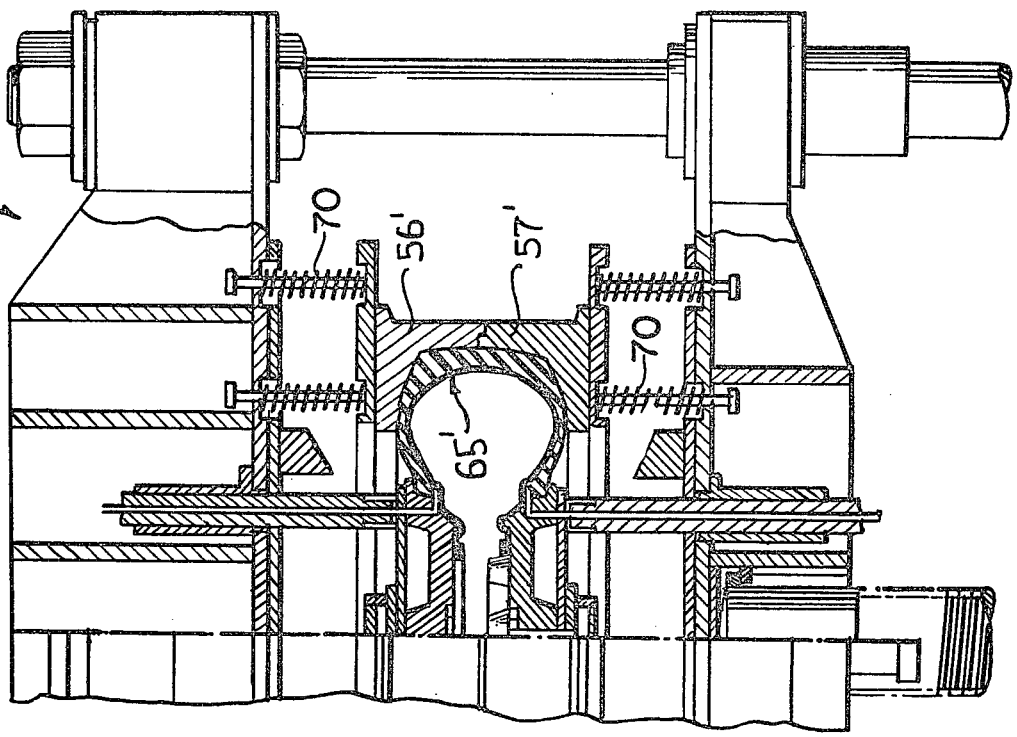
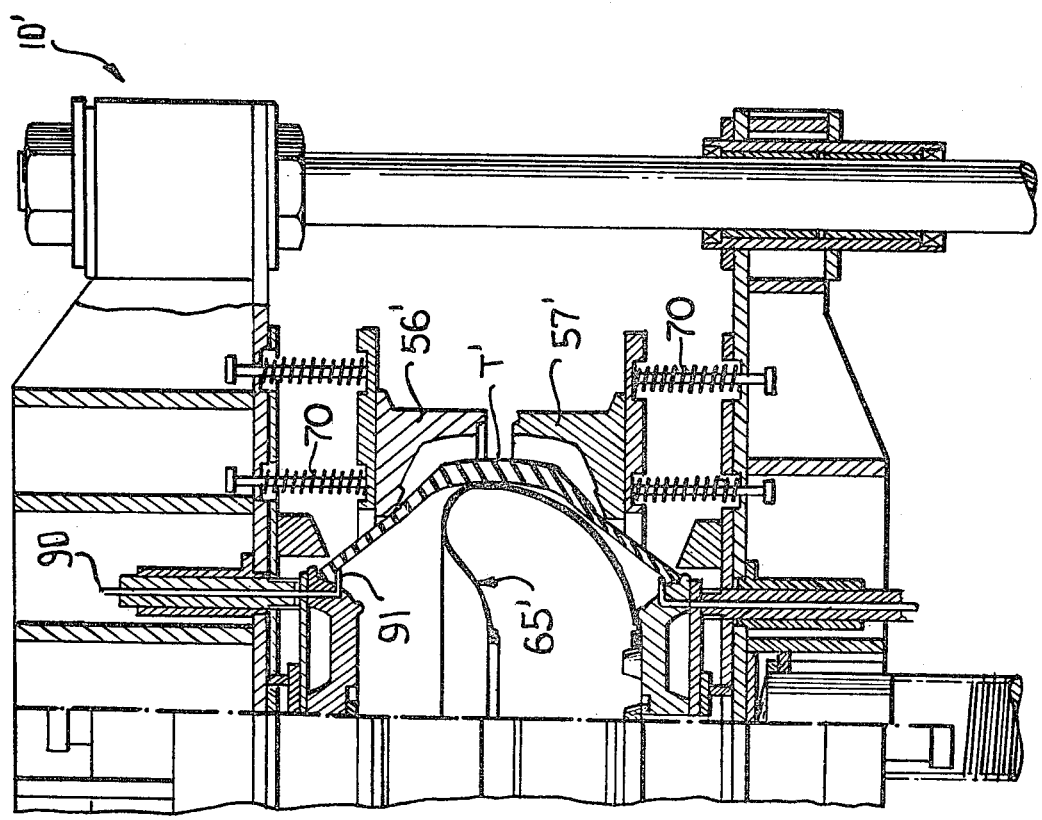

METHOD OF RETREADING A TIRE INCLUDING TIRE DIAMETER FORESHORTENING BY VACUUM GRIP

This application is a divisional application of application Ser. No. 628,902 filed Nov. 5, 1975 and now U.S. Pat. No. 4,035,118 which in turn is a divisional application of U.S. application Ser. No. 391,816 filed Aug. 27, 1973 and now U.S. Pat. No. 3,997,284 in the name of Kenneth T. MacMillan entitled AUTOMATIC PRODUCTION MOLDS.

This invention relates to a novel method of retreading tires either manually, semi-automatically or fully automatically by inserting an annular bladder within the interior of a tire and positioning the tire within a mold, and creating an annular low pressure area between marginal portions of the bladder and a pair of axially opposed bead aligner wheels.

The foregoing object creates an annular partial vacuum between marginal edge portions of each bladder and the associated bead aligner wheels to assure that upon further inflation of the bladder, the tire is urged into intimate conformity with the mold and, just as importantly, that there is no misalignment between the assembled components during the retreading operation.

A further object of this invention is to provide a novel method of the type aforesaid including the steps of positioning beads of the tire upon the bead aligner wheels, pressurizing the interior of the bladder to create the low pressure area between the marginal portions of the bladder and the bead aligner wheels, closing the mold, and moving the bead aligner wheels toward each other.

A further object of this invention is that of providing a method of retreading a tire by inserting a tire and an annular bladder between a pair of open matrices with marginal portions of the bladder projecting beyond beads of the tire and resting upon peripheral edge portions of axially opposed bead aligner wheels; inflating the bladder to form an annular gap sealed between an annular terminal edge of each bladder marginal portion, an annular outboard portion of each bladder and opposing annular portions of the bead aligner wheel peripheral edge portions; closing the matrices; and further inflating the bladder to urge the tire into intimate conformity with the matrices.

A further object of this invention is that of performing the novel method as last-mentioned including the steps of moving the bead aligner wheels and/or matrices toward each other after the performance of the first inflating step, and creating a partial vacuum in the annular gap by the performance of the first inflating step.

With the above and other objects in view that will hereinafter appear, the nature of the invention will be more clearly understood by reference to the following detailed description, the appended claims and the several views illustrated in the accompanying drawings.

IN THE DRAWINGS:

FIG. 6 is a fragmentary top plan view of the bladder associated with the machine of FIGS. 1 through 3, and illustrates raised ribs upon an exterior surface defining therebetween vent means or passages terminating short of enlarged beads at inner edges of the bladder.

FIG. 7 is a sectional view taken generally along line 7—7 of FIG. 6, and more fully illustrates the raised beads above the exterior surface of the bladder and notches in opposing surfaces of the beads defining means for permitting the introduction of fluid into and the removal of fluid from the bladder interior.

FIG. 8 is a fragmentary enlarged cross-sectional view taken along line 8—8 of FIG. 6, and more fully illustrates the manner in which the notches of the bladder beads are in axial alignment.

FIG. 9 is a view looking axially at one of the pair of bead aligner wheels of this invention, and illustrates a circular continuous uninterrupted sealing rib and a plurality of venting grooves adapted to be placed in fluid communication with atmosphere through bores in a flange of the bead aligner wheels.

FIG. 10 is an axial sectional view taken through a pair of the bead aligner wheels of the invention, and illustrates the manner in which fluid is introduced into the bladder as well as the manner in which air is vented to atmosphere from between the exterior surface of the bladder and an interior surface of a tire undergoing a recapping operation.

FIG. 11 is a fragmentary elevational view partially in section of a modification of the machine of FIGS. 1–3, and illustrates the manner in which the diameter of a tire is foreshortened by being mechanically clamped to the bead aligner wheels in lieu of a vacuum clamping to be described hereinafter with respect to the machine of FIGS. 1–3.

FIG. 12 is a sectional view identical to FIG. 11 but illustrating the matrices in their closed position.

Figure 1:
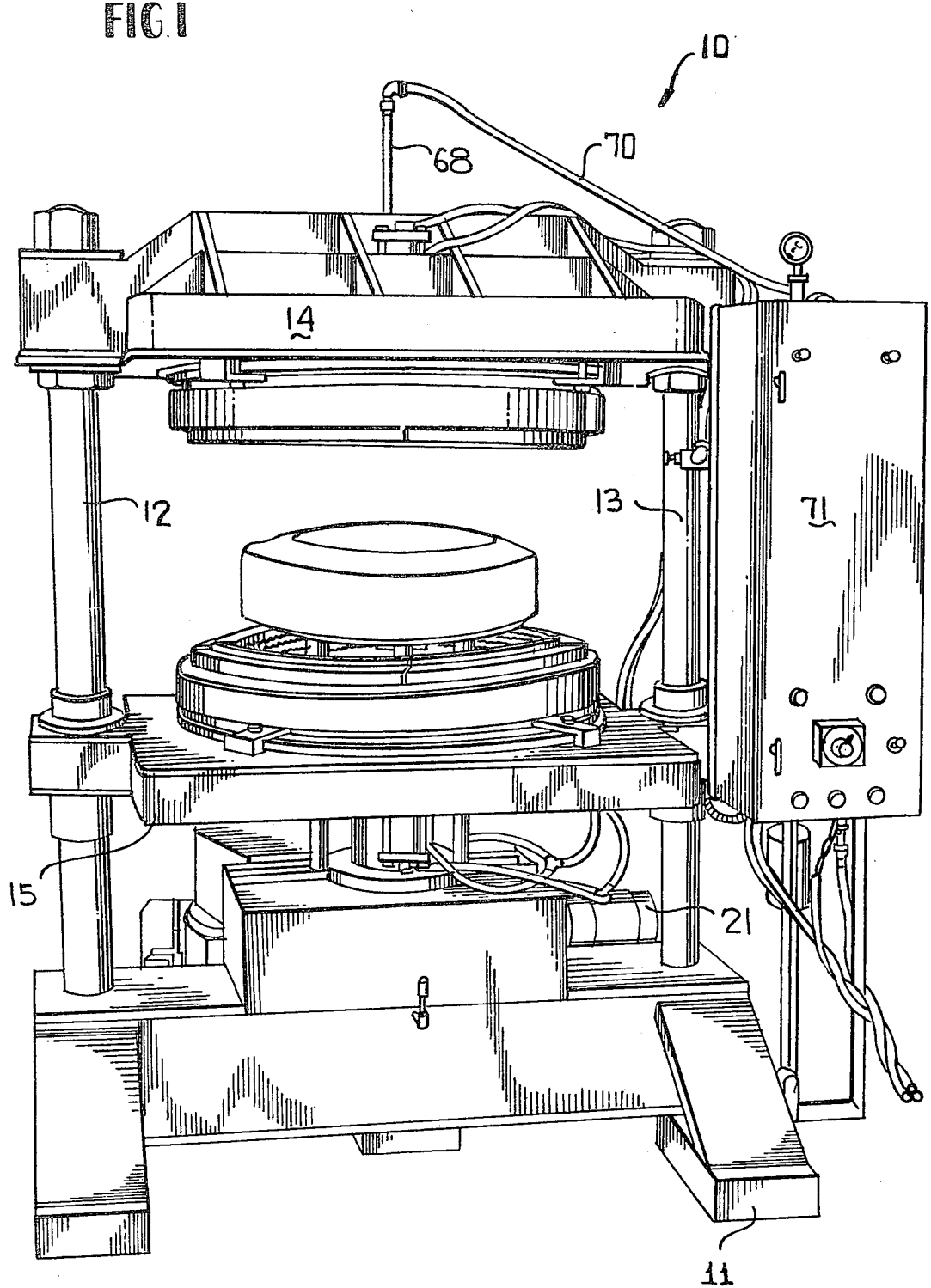
FIG. 1 is a perspective front view of a novel automatic retreading machine constructed in accordance with this invention, and illustrates a pair of platens in the open position thereof carrying segmented matrices with a tire located upon a lower bead aligner wheel.
Figure 2:
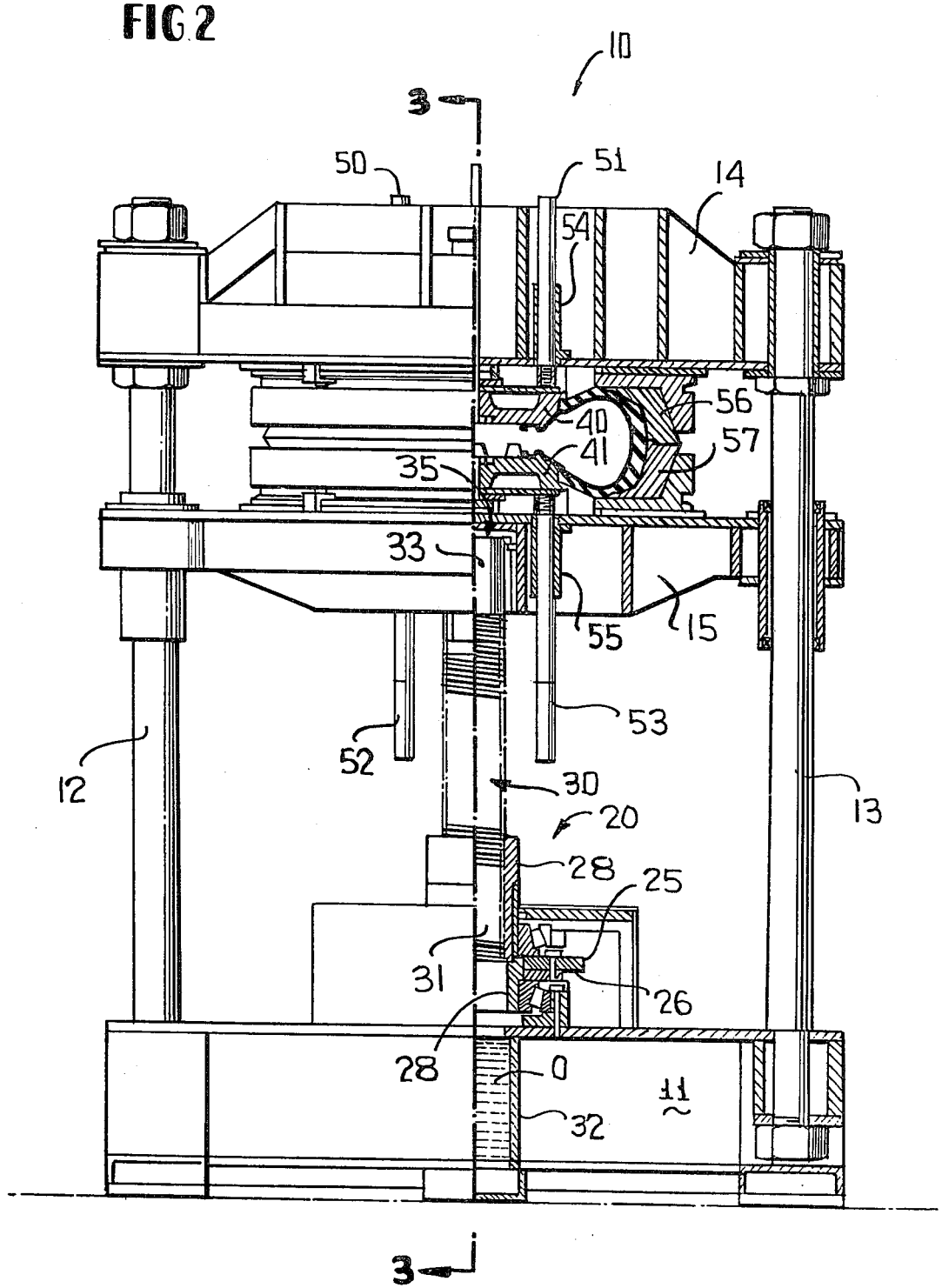
FIG. 2 is a front elevational view of the machine of FIG. 1 partially in cross section, and illustrates the matrices closed and a bladder under pressure maintaining a tire to be retreaded in conformity with the interior of the matrices.
Figure 3:
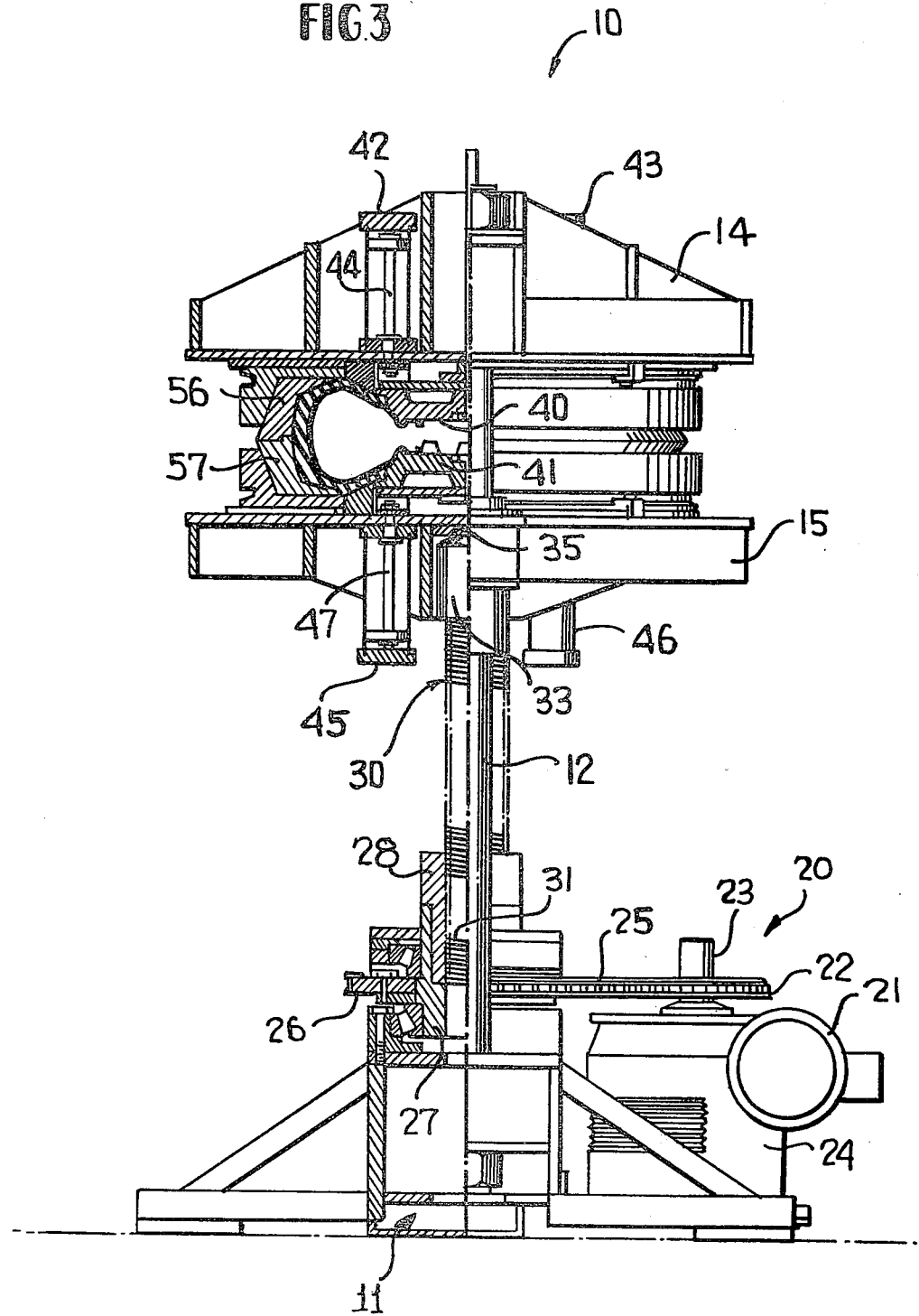
FIG. 3 is a cross-sectional view taken generally along line 3—3 of FIG. 2, and particularly illustrates means for imparting motion to the bead aligner wheels and the drive for relatively moving the platens carrying the matrices relative to each other.

Reference is first specifically made to a machine 10 of FIGS. 1 through 3 which includes a conventional base 11 which has secured thereto in a conventional manner a pair of upstanding cylindrical supports 12, 13. An upper platen 14 is fixedly secured to an upper end portion (unnumbered) of the supports 12, 13 by nuts (unnumbered) in the manner readily apparent from the upper right hand portion of FIG. 2. The upper end portions (unnumbered) of the supports 12, 13 are, of course, threaded to receive the nuts and the latter may be adjusted or threaded to achieve alignment between the upper fixed platen 14 and a lower movable platen 15.

The movable platen 15 is provided with conventional bushings (unnumbered) which surround the supports 12, 13 and thus the platen 15 may be readily moved between the open position (FIG. 1) thereof and the closed position illustrated in FIG. 2.

Means for imparting relative movement between the platens 14, 15 is generally designated by the reference numeral 20 and includes an electric motor 21 connected to a suitable electrical source (not shown) which drives a sprocket 22 keyed to an output shaft 23 of a gear reducer 24. A drive chain 25 is entrained about the sprocket 22 and about a sprocket 26 (FIG. 2) suitably secured to a tubular stub shaft 27 which in turn is welded or otherwise secured to an internally threaded nut 28. A reciprocal member 30 in the form of a screw is threaded within the nut 28 in the manner readily apparent from FIGS. 2 and 3. A lower end portion 31 of the screw 30 is capable of descending into a suitable lubricant, such as oil O, maintained within a generally cylindrical reservoir or sump 32. Accordingly, upon the ascent of the screw 30, the oil deposited upon the end portion 31 will maintain the threads (unnumbered) of the nut 28 continuously lubricated during the reciprocal motion imparted to the platen 15.

An upper end portion 33 of the screw 30 is provided with means, generally designated by the reference numeral 35, for achieving self-centering between the platen 15 and the platen 14. The means 35 is simply a convex surface on the end portion 33 of the screw 30 which bears against a planar (unnumbered) surface of the platen 15. Thus, if there is any misalignment of a minor nature between the platens 14, 15 and the matrices associated therewith to be described more fully hereinafter, the platen 15 will tilt or cock as need be to an extent permitted by the bushings (unnumbered) associated with the supports 12, 13 thus assuring alignment between the matrices and the tire therein. Furthermore, the platen 15 though of a relatively rigid construction can still flex somewhat under the force applied thereto by the screw 30 and this in turn achieves a self-adjusting or self-centering between the platens 14, 15 and the matrices carried thereby.

An upper bead aligner wheel 40 and a lower bead aligner wheel 41 (FIGS. 2, 3 and 10) are reciprocally carried by the respective platens 14, 15 and are mounted thereon for relative reciprocal movement toward and away from each other in a conventional manner. More specifically, a pair of fluid motors 42, 43 carried by the upper platen 14 include identical pistons 44 (only one of which is illustrated in FIG. 3) which are secured to the upper bead aligner wheel 40 for imparting motion thereto in a conventional manner. Likewise, fluid motors 45, 46 carried by the lower platen 15 include piston rods 47 (only one of which is illustrated) for reciprocating the bead aligner wheel 41 in the manner readily apparent from FIG. 3.

During the reciprocal motion imparted to the bead aligner wheels 40, 41 guidance is provided by guide rods 50, 51 secured to the bead aligner wheel 40 and by the guide rods 52, 53 (FIG. 2) secured to the bead aligner wheel 41. The rods 50, 51 and 52, 53 are slidably received in tubular guides 54, 55, respectively, (only one of each being shown in FIG. 2) carried by the respective platens 14, 15.

Conventional segmented matrices 56, 57 are carried by the platens 14, 15 and are operative in the manner described in commonly assigned abandoned U.S. application Ser. No. 287,826 in the name of Kenneth T. Mac-Millan in favor of which was filed a Rule 60 continuation application under Ser. No. 514,486 filed Oct. 15, 1974 which was in turn abandoned in favor of another Rule 60 continuation application filed Apr. 16, 1975 under Ser. No. 568,738, and now abandoned. Though specifically utilizing segmented matrices 56, 57, the machine 10 may be modified in the manner to be described hereinafter in order that the same can utilize "full" or nonsegmented circular matrices.

Reference is now made specifically to FIG. 10 which illustrates the bead aligner wheels 40, 41 in more specific detail. Since the bead aligner wheels 40, 41 are essentially of an identical construction like reference numerals have been applied thereto. The bead aligner wheels 40, 41 each include opposing sealing surfaces 60, 60 which are essentially normal to the axis of the bead aligner wheels 40, 41 and to the axis of the screw 30. Radially outboard of each of the sealing surfaces 60, 60 is a raised continuous uninterrupted circular rib 61, 61 (FIGS. 9 and 10) each of which is cooperative with a bladder 65 in a manner to be described more fully hereinafter. Radially outboard of each rib 61,61 is a generally curved shoulder or surface (unnumbered) which has formed therein a plurality of bleed notches or grooves 62, 62 each of which terminates at a bore 63 formed in a flange 64 of each bead aligner wheel 40, 41. The notches 62 and bores 63 cooperate with the bladder 65 in a manner to be described more fully hereinafter to bleed entrapped air from between an exterior surface of the bladder 65 and an interior surface of a tire T between the matrices 56, 57 to atmosphere during the pressurization of the interior of the bladder 65.

It is mandatory to preclude the bladder 65 from being pinched during the closing of the matrices 56, 57 as well as during the closing of the bead aligner wheels 40, 41, and accordingly one or both of the bead aligner wheels 40, 41 are provided with a plurality of axially projecting bosses 66 (FIG. 9). In the embodiment of the invention illustrated, the bead aligner wheel 41 has four such bosses 66 and during the closing of the bead aligner wheels 40, 41, the bosses 66 contact the sealing surface 60 of the bead aligner wheel 40 and assure that the bladder disposed therebetween will not be pinched. The bosses 66 are also preferably disposed with their axis on a common circle such that they also serve as means for locating the bladder upon the bead aligner wheels 40, 41 as will be described more fully hereinafter.

Inasmuch as it is necessary in keeping with the invention to inflate the bladder 65, a pressurized fluid, which is preferably heated air, is introduced into the space between the sealing surfaces 60, 60 of the bead aligner wheels 40, 41 through a part 67 which is in turn connected by a pipe 68, (FIG. 1) and a flexible conduit 70 to a suitable source (not shown) of pressurized fluid as, for example, hot air or a heated, non-explosive, non-compressible liquid or a source of steam or the like. Suitable conventional control means within a control panel 71 (FIG. 1) are provided for maintaining pressure internally of the bladder 65 at a desired level and suitable means may be provided for circulating the fluid media within the bladder 65. As an alternative, the fluid media need not be heated nor circulated within the bladder 65 and instead may be utilized simply to inflate the bladder 65 to a desired pressure with the heat required for the curing operation being achieved by conventionally heating the matrices 56,57 electrically or by the circulation of a heating fluid therethrough.

Reference is now made specifically to FIGS. 6–8 of the drawings which more specifically illustrates the bladder 65 as a generally annular member of a U-shaped cross section (FIG. 7) defined by a bight portion 72 and a pair of arms or legs 73, 74 terminating in inboardmost terminal edges or beads 75, 76, respectively. The cross-sectional thickness of the legs 73–74 is thickest adjacent the beads 75, 76 and tapers progressively radially outwardly to a thinner though generally uniform cross-sectional thickness in the area of the bight portion 72. This tapering permits the bight portion 72 to conform to the interior configuration of the tire prior to outward progressive conformation of the leg 73, 74 against the inner surface of the tire sidewalls, as will be described more fully hereinafter. An exterior surface 77 of the bladder 65 includes a plurality of radially directed raised ribs 78 between which are defined valleys 80 which serve as bleed or venting passages for air entrapped between the inner surface of the tire sidewall and the exterior surface 77 of the bladder 65 in conjunction with the bleed grooves 62 and the notches 63 of the bead aligner wheels 40, 41. In other words, as the bladder 65 is being inflated (FIG. 10), the bight portion 72 thereof begins to progressively conform to the inner surface of the crown (unnumbered) of the tire T and in doing so, air between is forced toward the tire beads (unnumbered). Air which would otherwise be thus entrapped is expelled through the vents 80 at least some or all of which are aligned with the notches 62 of the bead aligner wheels 41, 42 resulting in the passage of this air to atmosphere through the bleed bores 63 of both bead aligner wheels 40, 41.

In order to assure that the bladder 65 is pressurized, the beads 75, 76 of the bladder 65 have respective aligned notches 80, 81 (FIGS. 7 and 8). Therefore, upon the introduction of fluid into the bladder 65 in the manner indicated by the unnumbered headed arrows in FIG. 10, the aligned nothches 80, 81 define port means for the introduction of such fluid into the bladder 65, as well as the exhausting therefrom.

A highly important feature of this invention is the manner in which the annular chambers A (FIG. 10) are formed between the sealing surfaces 60, 60, the ribs 61, 61, and the inboardmost portions of the arms 73, 74 of the bladder 65. Each annular chamber A is defined between two radially spaced annular sealing lines (unnumbered), a first of which is defined by the annular sealing contact between each of beads 61 and the annular portion of the bladder in contact therewith and a second of which is defined by the annular sealing contact between each of the surfaces 60 and the associated beads 75, 76. The significance of this feature is more specifically applicable to full circle matrices, as opposed to segmented matrices. In the former, the normal diameter of the tire T must be foreshortened in order that the full circle matrices may be closed without closing upon the tire T and/or assuring that the tire will be subsequently expanded from its foreshortened condition to seat properly within the full circle matrices. In order to fully appreciate this, reference is now made to FIGS. 4 and 5 of the drawings.

Figure 4:
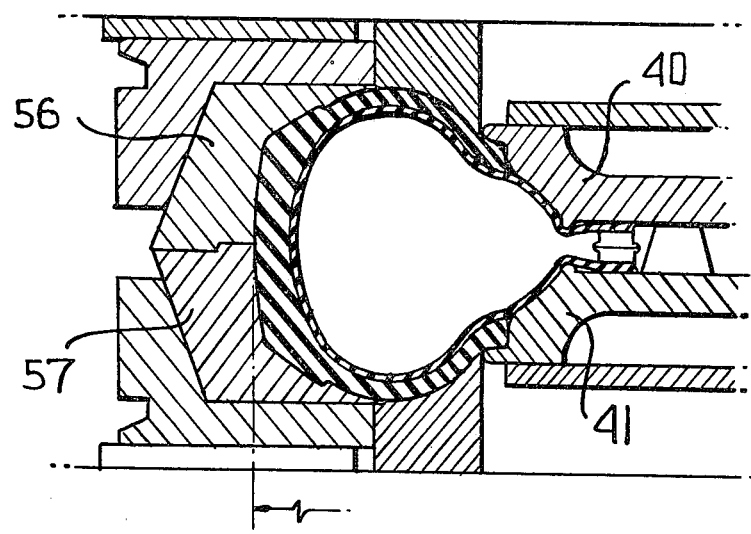
FIG. 4 is a fragmentary enlarged sectional view of a tire positioned within the closed matrices.
Figure 5:
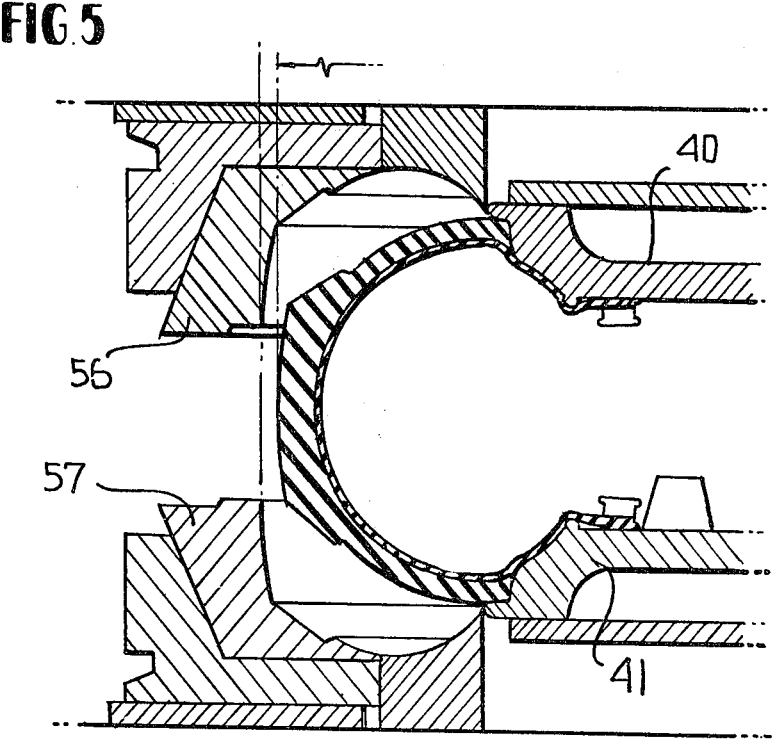
FIG. 5 is a fragmentary enlarged sectional view of a tire positioned within the opened matrices, and particularly illustrates the manner in which a partial vacuum retains the tire beads against the bead aligner wheels.

In FIG. 4, the matrices 56, 57 are shown closed and the inner surfaces thereof are in perfect conformity with the exterior of the tire T. The bladder 65 is, of course, pressurized at this point and due to the pressurization thereof, which is greater than atmosphere, the annular channels A are actually under a partial vacuum and, therefore, the beads 75, 76 are in hermetic sealing relationship with the surfaces 60, 60 of the bead aligner wheels 40, 41 and a tight hermetic seal is achieved between the ribs 61, 62 and the portions of the legs 73, 74 of the bladder 65 against which they contact. Therefore, upon the opening of the matrices, which in this case are full circle matrices, the partial vacuum within the annular chambers A holds the portions of the bladder legs 73, 74 inboard of the ribs 61, 61 tightly against the bead aligner wheels 40, 41. Accordingly, as the bead aligner wheels 40, 41 move away from each other, the diameter of the tire T is foreshortened (FIG. 5) thereby permitting the matrices 56, 57 to be fully closed prior to the movement of the bead aligner wheels 40, 41 toward each other to achieve the positive seating between the tire T and the matrices, as shown in FIG. 4. Thus, the built-up tire may be positioned in the manner shown in FIG. 5 and when the bladder is pressurized, it will assume the position shown in this same figure. Thereafter and with the bead aligner wheels 40, 41 spread apart, the full circle matrices are closed and thereafter the bead aligner wheels may be moved to the closed position of FIG. 4 incident to the performance of the curing operation.

Another machine 10' constructed in accordance with this invention is illustrated in FIGS. 11, 12 and components thereof corresponding to those of the machine 10 of FIGS. 1 through 3 bear like reference numerals, though the same have been primed. In keeping with the construction of the machine 10', the matrices 56', 57' are full circle matrices, not segmented. As compared to the machine 10, the machine 10' utilizes the concept of foreshortening a tire T' prior to the closing of the matrices, but the beads thereof are mechanically gripped in the manner illustrated in FIG. 11. The mechanism includes a plurality of rods 90 passing through suitable guide bores (unnumbered) and terminating in angular ends 91. The opposite ends of the rods 90 are rotated and reciprocated by conventional apparatus.

The tire T' is inserted between the matrices 56', 57' when the latter and the platens 14', 15' are in their fully opened positions after which the bead aligner wheels 40', 41' are moved toward each other and the beads (unnumbered) of the tire T' are automatically located. Thereafter, the rods 90 are rotated from an out of the way position to the position shown in FIG. 11, and the bead aligner wheels 40', 41' are retracted to the illustrated position of FIG. 11. The bladder 65' is then inserted in the manner illustrated in FIG. 11 after which the full circle matrices 56', 57' are closed. Once the latter are closed, the bead aligner wheels 40', 41' then move toward each other to their final position (FIG. 12) and fluid is introduced into the bladder 65' to pressurize the interior sufficiently depending, of course, upon the cure time, temperature, tire compound, etc., involved.

The machines 10 and 10' are provided with suitable control means including, of course, the control cabinet 71 and the components thereof which, for the most part, are conventional. However, in keeping with this invention, the circuitry for the motor 21 includes a switch (not shown) carried by either of the platens 14, 15 such that upon the closing of the latter, the switch will be activated to deenergize the motor 21. Preferably, the switch actuates through a trip relay of a conventional construction on which the amperage may be adjusted to automatically shut off the drive motor 21 when the matrices 56, 57, or 56', 57' come together with sufficient force. When the motor 21 shuts off, a conventional break automatically locks, although the latter is not an absolute requirement of the system. However, due to the adjustable nature of the relay, it is unnecessary to adjust the distance between the platens at any time even if the matrices are changed or when spacers are inserted in a coventional manner, and this also makes the machines 10, 10' self-adjusting.

While preferred forms and arrangements of parts have been shown in illustrating the invention, it is to be clearly understood that various changes in details and arrangement of parts may be made without departing from the scope and spirit of this disclosure.

I claim:

1. A method of inserting a tire to be cured in a press having relatively movable matrices defining a cavity and relatively movable bead aligner wheels comprising the steps of sandwiching each bead of a tire between one of the bead aligner wheels and an inner peripheral edge portion of a bladder disposed at least partially within the tire, utilizing a pressure differential to clamp each bladder inner peripheral edge portion to its associated bead aligner wheel by creating the differential pressure between the interior of the bladder and a closed annular chamber defined by two radially spaced annular sealing lines between each bead aligner wheel and its associated bladder edge portion, separating the bead aligner wheels during the latter clamping to radially foreshorten the tire, and thereafter closing the matrices.

2. The method as defined in claim 1 including the step of pressurizing the interior of the bladder to create the pressure differential prior to the complete closing of the matrices.

3. The method as defined in claim 1 wherein the matrices are full circle matrices.

4. The method as defined in claim 1 wherein the matrices are segmented matrices.

5. The method as defined in claim 1 wherein one of the annular sealing lines of each closed annular chamber is defined by an annular bead carried by an associated bead aligner wheel in annular sealing contact with the associated bladder edge portion.

6. The method as defined in claim 5 wherein the one annular sealing line is radially outboard of the remaining annular sealing line of each closed annular chamber.

7. The method as defined in claim 6 wherein the remaining annular sealing line of each closed annular chamber is formed by a free terminal edge of each bladder edge portion in annular sealing contact with an associated bead aligner wheel.

8. A method of inserting a tire to be cured in a press having relatively movable matrices defining a cavity and relatively movable bead aligner wheels comprising the steps of utilizing pressure differential to clamp a peripheral bead of a tire to each bead aligner wheel, the latter step including forming an annular closed chamber between each bead aligner wheel and a peripheral edge of an associated bladder at least partially housed within the tire, pressurizing the bladder to force air out of each annular chamber thereby creating the pressure differential, thereafter moving the bead aligner wheels away from each other to radially foreshorten the tire dimensions, then closing the matrices to form the cavity.

9. The method as defined in claim 8 wherein the pressure within the annular chamber is negative (vacuum).

10. The method as defined in claim 8 wherein the annular closed chamber is defined between two radially spaced annular sealing lines between each bead aligner wheel and its associated bladder peripheral edge.

11. The method as defined in claim 10 wherein one of the annular sealing lines of each closed annular chamber is defined by an annular bead carried by an associated bead aligner wheel in annular sealing contact with the associated bladder peripheral edge.

12. The method as defined in claim 11 wherein the one annular sealing line is radially outboard of the remaining annular sealing line of each closed annular chamber.

13. The method as defined in claim 12 wherein the remaining annular sealing line of each closed annular chamber is formed by a free terminal edge of each bladder peripheral edge in annular sealing contact with an associated bead aligner wheel.

* * * * *